(12) United States Patent
Lehmkul (10) Patent No.: US 10,214,099 B2
(45) Date of Patent: Feb. 26, 2019

(54) CHAMBER FOR REMOVING SUBSTANCES FROM A FLUID

(71) Applicant: A. Kayser Automotive Systems GmbH, Einbeck (DE)

(72) Inventor: Meinolf Lehmkul, Göttingen (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 99 days.

(21) Appl. No.: 15/409,682

(22) Filed: Jan. 19, 2017

(65) Prior Publication Data

US 2018/0134151 A1    May 17, 2018

(30) Foreign Application Priority Data

Nov. 17, 2016  (DE) .................. 10 2016 013 764

(51) Int. Cl.

| | |
|---|---|
| *B01D 53/04* | (2006.01) |
| *F02M 25/08* | (2006.01) |
| *B60K 15/035* | (2006.01) |
| *F02M 35/10* | (2006.01) |
| *B60K 15/03* | (2006.01) |

(52) U.S. Cl.
CPC .... *B60K 15/03504* (2013.01); *B01D 53/0407* (2013.01); *F02M 25/0854* (2013.01); *B01D 2253/102* (2013.01); *B01D 2257/702* (2013.01); *B01D 2259/4516* (2013.01); *B60K 2015/03236* (2013.01); *B60K 2015/03514* (2013.01); *F02M 35/10222* (2013.01)

(58) Field of Classification Search
CPC ............ B01D 53/04; B01D 2259/4516; B60K 15/03504; B60K 2015/03236; F02M 25/0854; F02M 35/10222
USPC .... 95/146; 96/132, 134, 137, 139, 152, 147; 123/509
See application file for complete search history.

(56) References Cited

U.S. PATENT DOCUMENTS

| | | | | |
|---|---|---|---|---|
| 2,190,168 | A * | 2/1940 | Armistead | A45D 20/44 34/60 |
| 3,119,673 | A * | 1/1964 | Asker | B01D 53/26 62/271 |
| 3,716,969 | A | 2/1973 | Maeda | |
| 4,304,577 | A * | 12/1981 | Ito | B01D 53/261 96/127 |
| 4,698,072 | A * | 10/1987 | Rohde | B01D 53/0423 95/119 |
| 4,717,401 | A * | 1/1988 | Lupoli | B01D 53/0446 96/141 |

(Continued)

FOREIGN PATENT DOCUMENTS

DE      112013001330 T5     12/2014

*Primary Examiner* — Frank M Lawrence, Jr.
(74) *Attorney, Agent, or Firm* — Richard M. Goldberg (57) ABSTRACT

A chamber for removing substances from a fluid and particularly for adsorbing fuel vapor from a fuel tank of a vehicle, includes a housing having two ports and a longitudinal axis, an adsorbent material arranged within the housing, the adsorbent material completely covering a transverse cross-section of the housing, such that the adsorbent material forms at least one barrier between the two ports, and a thickness of the adsorbent material in the direction of the longitudinal axis is less than the length of the housing in the longitudinal direction, thereby creating two voids.

18 Claims, 5 Drawing Sheets

(56) References Cited

U.S. PATENT DOCUMENTS

| | | | |
|---|---|---|---|
| 4,750,923 A * | 6/1988 | Haruta | B01D 53/0415 55/319 |
| 4,758,255 A * | 7/1988 | Yamada | B01D 53/0407 123/519 |
| 4,855,046 A | 8/1989 | Meehan | |
| 5,398,660 A * | 3/1995 | Koyama | F02M 25/0854 123/519 |
| 5,538,542 A * | 7/1996 | Watanabe | B01D 53/0446 123/519 |
| 6,835,236 B2 * | 12/2004 | Lacey | B01D 35/02 210/496 |
| 2008/0202338 A1 | 8/2008 | Wardle | |
| 2011/0315126 A1 | 12/2011 | Yoshida et al. | |
| 2013/0183207 A1 * | 7/2013 | Kimoto | B01D 53/02 422/255 |
| 2013/0186375 A1 | 7/2013 | Hasegawa et al. | |
| 2013/0263740 A1 | 10/2013 | Mani | |
| 2013/0263741 A1 * | 10/2013 | Mani | F02M 25/0854 96/112 |
| 2014/0352542 A1 * | 12/2014 | Mani | F02M 25/0854 96/154 |
| 2015/0007799 A1 * | 1/2015 | Takeshita | F02M 25/0854 123/519 |
| 2015/0040765 A1 | 2/2015 | Zastera et al. | |
| 2017/0028342 A1 | 2/2017 | Zastera et al. | |

\* cited by examiner

CHAMBER FOR REMOVING SUBSTANCES FROM A FLUID

BACKGROUND OF THE INVENTION

Unless otherwise indicated herein, the devices and approaches described in this section ("Background of the Invention") are not prior art to the claims in this application and are not admitted to be prior art by inclusion in this section.

The present application relates to a chamber for removing substances from a fluid. Also disclosed is a container for adsorbing fuel vapor from a fuel tank of a vehicle, the container including the chamber. In addition, a method of manufacturing the chamber is also disclosed.

Forming an adsorbing structure can be expensive. An adsorbing structure may be formed from oxygen containing compounds, carbon based compounds, or polymer based compounds. Other compounds are also possible. In some cases, high temperatures (e.g., 1100° C.) may be required to form the structure. Further, it may be difficult to extrude a mixture of adsorbent material (e.g. activated carbon) and form the adsorbent material, along with additional material (e.g., ceramic), into a suitably shaped structure, such as a honeycomb. The extrusion may require a great deal of water. Further, the water must be removed from the structure before firing the structure in order to avoid damage (e.g., cracks in the structure), and removal of the water may be problematic. In particular, if the water is not removed carefully the structure may shrink or crack.

While the use of a flux material can alleviate some of the problems in forming an adsorbing structure, the process can still be time consuming and expensive.

Adsorbing material (i.e., an adsorbent material), possibly in the form of an adsorbing structure, may be used to remove substances from a fluid. Removable substances may include organic substances and non-polar adsorbates. Removable substances may include chemical agents. More specifically, removable substances may include fuel vapor (i.e., fuel tank emissions or engine exhaust, possibly containing hydrocarbon emissions), volatile organic compounds, and chemical substances such as ozone.

Adsorbing material (e.g. in the form of an adsorbing structure) may be used in an automobile engine or in an office machine such as a xerographic device. The adsorbent material may be placed within a chamber, and fluid to be acted on by the adsorbent material may be directed through the chamber.

For example, adsorbent material may be used in the context of an internal combustion engine of a motorized vehicle, such as an automobile. Fuel vapor from the engine may be directed through the chamber in order to prevent release of substances in the fuel vapor into the atmosphere. Accordingly, a port (i.e. opening or aperture) from the chamber may be connected to the fuel tank such that the fuel vapor from the fuel tank passes through the chamber and substances in the fuel vapor are adsorbed by the adsorbent material in the chamber. In some cases, multiple chambers (e.g., at least two, possibly more) may be connected to each other within a container, and a fluid such as the fuel vapor may be directed through each chamber in the container before being allowed to exit into the atmosphere. In addition, air from the atmosphere may pass through the chamber and cause adsorbed substances to exit the chamber toward the combustion engine so that they are burned in the internal combustion engine.

In summary, when the vehicle is stopped, fuel vapor from the fuel tank flows through one of the ports (e.g., a charge port) into the chamber and is adsorbed by adsorbent material in the chamber. During operation of the engine, atmospheric air is introduced through another of the ports (e.g., an atmosphere port) and the previously adsorbed fuel vapor is desorbed and carried to the engine to be combusted within the engine. There may be multiple chambers (at least two, possibly more) adapted for adsorbing and desorbing HC (hydrocarbons) or other substances within a container.

In addition to satisfactorily adsorbing and desorbing substances from a fluid, adsorbent material in the chamber should also have a sufficiently low flow resistance to air passing through the chamber. In other words, there should be an adequate flow rate of air so that air exits the chamber promptly. In particular, in the context of a vehicle, the chamber may be connected to a fuel tank of the vehicle. When the fuel tank of the vehicle is filled with liquid (e.g. gasoline) the liquid pushes air through the chamber. If adsorbent material in the chamber has a flow resistance that is too high, then it may be unacceptably difficult to refuel the vehicle. For example, air unable to exit the fuel tank through the chamber may cause the pressure in the fuel tank to rise and cause a pump to stop pumping fuel into the fuel tank. Accordingly, adsorbent material in the chamber should allow air to pass through the chamber at a rate of at least 50 to 70 l/min, at least 55 to 65 l/min, at least 58 to 62 l/min, or at least about 60 l/min. The diurnal breathing loss of substances from the chamber (e.g., evaporative emission of hydrocarbons in a three-day diurnal test) should be below 20 mg per day. Further information regarding diurnal testing and breathing loss can be found in "The California Low-Emission Vehicle Regulations", Aug. 7, 2012 (https://www.arb.ca.gov/msprog/levprog/cleandoc/cleancomplete_lev-ghg_regs_3-12.pdf, retrieved Nov. 21, 2016).

In addition, the chamber for removing substances from a fluid should be easy and inexpensive to assemble, particularly in comparison to the adsorbing structure described above.

SUMMARY OF THE INVENTION

According to an aspect, a chamber for removing substances from a fluid is provided. The chamber comprises a housing having two ports (i.e., openings or apertures) and a longitudinal axis. The ports may be located at opposing (i.e., opposite) ends of the housing. For example, the ports may be located on (or adjacent to) the longitudinal axis. Adsorbent material is arranged within the housing. The adsorbent material may be capable of (i.e., adapted for) removing substances from a fluid. The adsorbent material completely covers a transverse cross-section of the housing, such that the adsorbent material forms at least one barrier between the two ports. A thickness of the adsorbent material in the direction of the longitudinal axis of the housing is less than the length of the housing in the longitudinal direction, thereby creating two voids (i.e., spaces).

Each void may be a region or area free of adsorbent material. The longitudinal axis may also be referred to as the lengthwise axis. The barrier may be an obstacle or hindrance to substances in fluid passing through the housing. In particular, the barrier may obstruct the passage of substances in fluid when the fluid passes through the housing. For example, air may pass through the barrier unhindered, but hydrocarbons may be hindered (or adsorbed) by the barrier.

The voids may be of a size suitable for diffusing the fluid within the housing. The periphery of the adsorbent material may come in contact with the sides of the housing in order to form the at least one barrier between the two ports. In view of the barrier, when the fluid enters through one of the ports, the fluid must pass through a portion of the adsorbent material and one of the voids before exiting through the other port.

The housing may have a cylindrical shape. In particular, the housing may be a right cylinder and the longitudinal axis may be the axis of the cylinder. The housing may also have a parallelepiped or rhomboid shape.

In some cases, the adsorbent material extends diagonally across the housing. In other words, the adsorbent material may extend in a direction such that an angle formed between the adsorbent material and the longitudinal axis of the housing is an acute angle. Thus, the adsorbent material may be inclined from the longitudinal axis of the housing.

The adsorbent material may be in the form of a continuous piece of material that comes in contact with the housing at multiple different points. Alternatively, the adsorbent material may be in the form of at least one disk arranged across the housing. In this case, the adsorbent material is perpendicular to the longitudinal axis of the housing. Further, the adsorbent material may be arranged in the form of multiple disks extending across the housing. Each of the disks may be perpendicular to the longitudinal axis of the housing.

The adsorbent material may be arranged in two sets such that the fluid passes through adsorbent material of one of the sets before passing through one of the voids and passes through adsorbent material of the other one of the sets after passing through the same void.

In some cases, the chamber may comprise a guide for holding the adsorbent material. The guide may be a support or a holder. The guide may be porous, the pores of the guide being smaller in size than the adsorbent material. The guide may provide a channel for the adsorbent material. The channel may be understood as a path, a free space, room, or a volume. Basically, the guide supports the adsorbent material within the housing. The adsorbent material may be contained within the guide, and the voids may be outside of the guide. The guide may extend across the housing from a first side of the housing to a second side of the housing opposite to the first side.

The guide may extend diagonally between two different walls of the housing. In other words, the guide may be inclined with respect to the longitudinal axis of the housing. The guide may form an angle that is obtuse and/or acute with respect to the longitudinal axis of the housing. Alternatively, the guide may extend horizontally between two different walls of the housing. In other words, the guide may be perpendicular with respect to the longitudinal axis of the housing.

The guide may be in the form of a grid or lattice. The guide may be produced via injection molding. The guide may cross the housing at least twice in order to create two barriers between the two ports of the housing, such that a cross-section of the guide is V-shaped.

Edges of the guide may be in continuous contact with the housing. In some cases, all edges of the guide may be in continuous contact with the housing. In other words, the entire periphery or border of the guide may be in continuous contact with the housing.

The guide may be formed from at least two segments. The segments may be spaced apart from each other to create the channel for the adsorbent material.

The chamber may have a horizontal axis that is perpendicular to the longitudinal axis, whereby the angle between the horizontal axis and one of the segments of the guide is between 20 and 70 degrees. In particular, the angle may be between 40 degrees and 60 degrees, 45 degrees and 55 degrees, or between 40 degrees and 50 degrees.

In a cross-sectional view, two of the segments of the guide may form a triangle with a side of the housing and one of the voids may be within the triangle. In the cross-sectional view, the segments meet at an obtuse angle opposing the side of the housing, and the segments form acute angles with the side of the housing. Further, the segments that meet at the obtuse angle form an arc.

Pairs of the segments of the guide may be parallel to each other. In particular, the pairs of the segments that are spaced apart from each other to create the channel may be parallel to each other.

The segments may be produced by injection molding as one piece, i.e., as a single entity, rather than being assembled from multiple parts. The guide may be arranged in a zigzag configuration within the housing. In particular, the guide, when viewed in cross-section, may cross from one side of the housing to the other side of the housing multiple times. In addition, the guide may cross the housing three or more times.

An end portion of one of the segments that is closest to one of the ports may be parallel to the longitudinal axis of the housing. This may enable the guide to act as an attachment point for a funnel in order for adsorbent material to be inserted into the channel. In some cases, adsorbent material may be inserted into the channel without using a funnel.

The chamber may further comprise a supporting element for holding the guide. The supporting element may extend through segments of the guide. The supporting element may be used to insert the guide into the housing.

The chamber may also be referred to as a region, layer, stage, or bed. When included in a container with at least one further chamber, the chamber described above may be referred to as a vent-side chamber or an atmosphere-side chamber.

A cap or cover may be attached to one end of the chamber. One of the two ports may extend through the cap, and multiple pegs may protrude from the cap toward the inside of the chamber.

An air permeable element may be arranged within the housing between the cap and an end of the guide. The air permeable element may be elastic. The air permeable element may be foam or a sponge. The pegs may be in contact with the air permeable element. The pegs may be arranged so as to push the air permeable element against the guide. The air permeable element may push down on the guide and the adsorbent material in order to hinder adsorbent material from escaping the housing. The air permeable element may have a disk shape. In particular, the air permeable element may continuously contact the walls of the housing. The air permeable element may be perpendicular to the longitudinal axis of the housing and may extend across the entire housing to block one of the ports.

The adsorbent material may comprise one or more of the following: an oxygen containing compound, a carbon based compound, a polymer based compound, zeolites, porous silica, porous alumina, pillared clays, molecular sieves. In particular, the adsorbent material may be active carbon.

The adsorbent material may include multiple components. There may be more than 100 components, more than 500 components, more than 1000 components or more than 5000 components. The components may have one or more of the following shapes: granular (irregular), spherical, cylindrical, hollow-cylinder, star, twisted spiral, asterisk, configured ribbons. The components of the adsorbent material may have a diameter of about 2 mm to about 8 mm. More particularly, the components may have a diameter of about 3 mm to about 7 mm, about 2 mm to about 6 mm, or about 3 mm to about 5 mm.

The components of adsorbent material may also be referred to as pellets, granules, or particulates. Advantageously, components of active carbon granules may be simple and inexpensive.

The adsorbent material may be made from raw materials including wood, peat, coal, coconut, synthetic polymer or natural polymer. The adsorbent material may be made via a variety of processes including chemical and/or thermal activation. The adsorbent material may include inorganic materials such as a molecular sieve, porous alumina, pillared clays, zeolites, porous silica, porous polymers. The adsorbent material may comprise standard canister filled carbons.

The adsorbent material may have an effective butane working capacity of about 6 g/deciliter to about 10 g/deciliter.

In some cases, one of the two ports opens to the atmosphere and the second port is arranged to receive the fluid. The fluid may be (or include) fuel vapor from a fuel tank of a vehicle.

According to another aspect, a container for adsorbing substances in fuel vapor from a fuel tank of a vehicle is provided. The container includes the chamber discussed above. The container further includes a second chamber. The second chamber includes further adsorbent material and is fluidly connected to the fuel tank such that a port of the second chamber can receive the fuel vapor from the fuel tank. The second chamber includes another port, such that it is also fluidly connected to the chamber described above. Alternatively, one or more additional chambers may be between the second chamber and the chamber described above. The adsorbent material of the second chamber may have a higher effective butane working capacity and/or a higher flow resistance in comparison to the adsorbent material of the chamber described above.

In some cases, each chamber includes multiple components of adsorbent material. Accordingly, the components of the second chamber may have a greater diameter in comparison to the components of the chamber described above. The adsorbent material in the chambers of the container may allow at least 40 l/min, at least 50 l/min, or at least 60 l/min of air to pass through with a pressure of about 20 mbar.

In some cases, the substances in the fluid are hydrocarbons. Further, the fluid may be fuel vapor.

According to yet another aspect, a method of manufacturing a chamber for removing substances from a fluid is provided. The chamber comprises a housing having two ports and a longitudinal axis. The method comprises axially inserting a guide into the housing. The guide forms a channel.

Edges of the guide are in continuous contact with the housing. In particular, edges or borders of at least two segments of the guide may be in continuous contact with the housing. Thus, the guide extends across the housing from a first side of the housing to a second side of the housing opposite to the first side.

The method further comprises arranging adsorbent material within the channel. The adsorbent material completely covers a transverse cross-section of the housing, such that the adsorbent material forms at least one barrier between the two ports. A thickness of the adsorbent material in the direction of the longitudinal axis of the housing is less than the length of the housing in the longitudinal direction, thereby creating two voids within the housing.

Installing the adsorbent may be particularly easy, especially if the adsorbent material is implemented in the form of components, as described above. Further, gravity and possibly a bit of shaking may be sufficient to arrange the adsorbent material in a suitable position within the housing.

The method further comprises axially inserting an air permeable element into the housing, so that the air permeable element contacts an end of the guide. The method further comprises placing a cap over the air permeable element, such that pegs protruding from the cap contact the air permeable element.

DETAILED DESCRIPTION

In the following text, a detailed description of examples will be given with reference to the drawings. It should be understood that various modifications to the examples may be made. In particular, one or more elements of one example may be combined and used in other examples to form new examples. Moreover, a number of method steps are described. The order of these steps may be modified, even when this is not explicitly stated.

Figure 1:
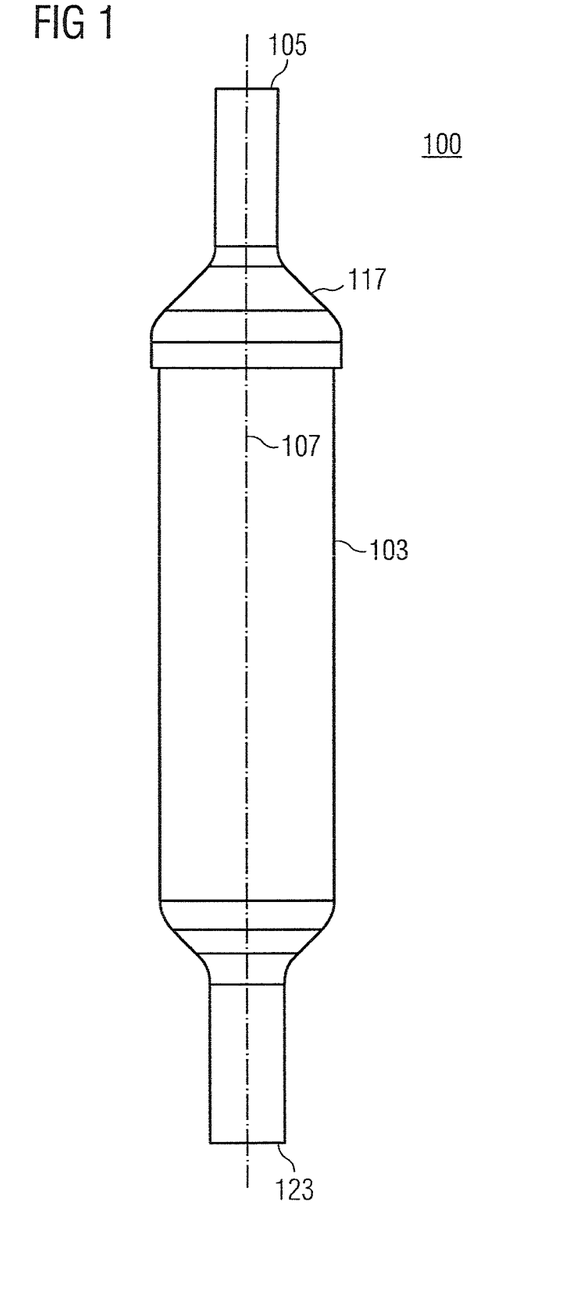
FIG. 1 shows an external view of a chamber for removing substances from a fluid.

FIG. 1 shows an external view of a chamber 100 for removing substances from a fluid. The chamber 100 may include a housing 103, ports 105 and 123 located at opposite ends of the housing 103, a longitudinal axis 107 bisecting the housing 103 in a lengthwise direction, and a cap 117 attached to one end of the housing 103. Although the housing is depicted as having a cylindrical shape, other shapes are also possible, e.g., parallelepiped.

The ports 105 and 123 may be arranged so as to enable the passage of the fluid through the chamber 100. The fluid may be a gas or a vapor, such as fuel vapor. Elements of the chamber 100 (or the entire chamber) may be formed of a resin material or plastic, such as polyamide resin. Alternatively, elements of the chamber 100 (or the entire chamber) may be formed of metal, such as aluminum. One of the ports 105 may be connected to the atmosphere and the other port 123 may be connected to a source of fluid. The fluid may pass through other chambers on the way to the chamber 100. Alternatively, the fluid may pass directly from the source of the fluid into the chamber 100. In some cases, the source of the fluid is a fuel tank.

Figure 2:
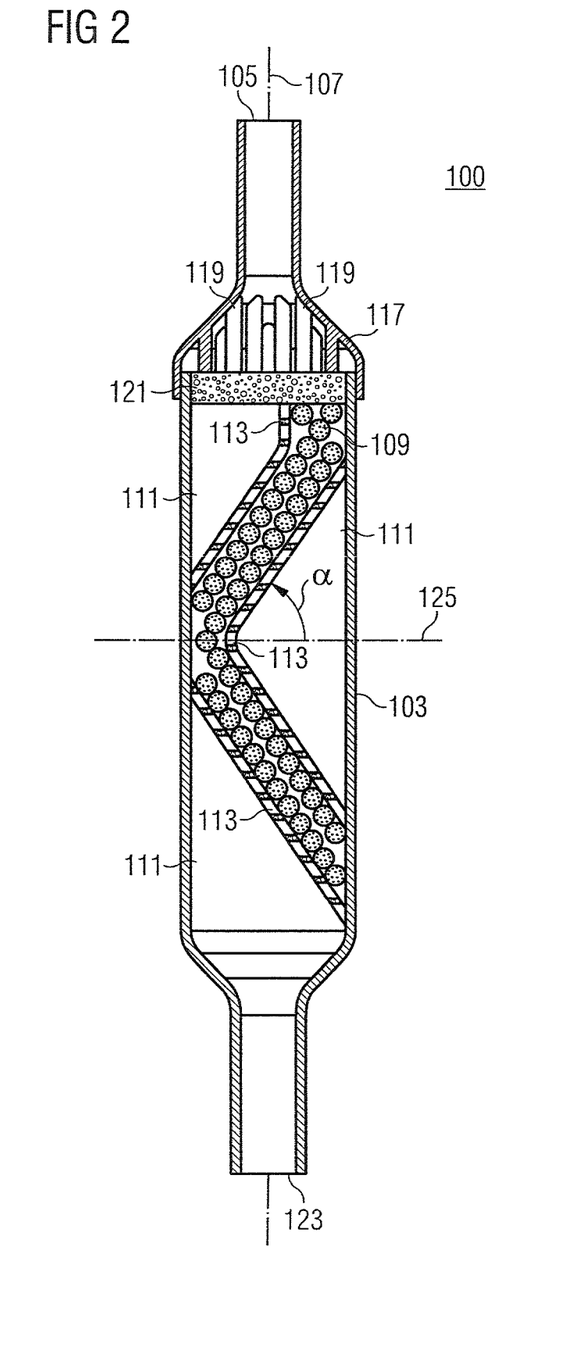
FIG. 2 shows a cross-sectional view of the chamber.

FIG. 2 shows a cross-sectional view of the chamber 100. Adsorbent material 109 is arranged within the housing 103. A guide holds the adsorbent material 109 within the housing 103. The guide is composed of multiple segments 113. Each segment 113 is a contiguous piece of the guide. Three of the segments 113 are shown in FIG. 2. However, other configurations of the guide are also possible. For example, the guide may include two segments 113 extending horizontally across the housing 103. Further, the guide might not be contiguous. For example, the guide may include multiple sets of disk-shaped segments 113 extending across the housing 103.

Each of the segments 113 may be porous, i.e., the segments 113 may have a grid or lattice structure.

The adsorbent material 109 is depicted as ball-shaped in the example of FIG. 2. The adsorbent material 109 could also be granular, cylindrical, hollow cylinder, star, twisted spiral, asterisk, or configured ribbons. The adsorbent material 109 is arranged within the housing such that it completely covers a transverse cross-section of the housing 103. Accordingly, the adsorbent material 109 forms at least one barrier between the two ports 105 and 123. In other words, fluid traversing the housing 103 from the port 123 to the other port 105 must pass through at least some of the adsorbent material 109.

In addition, a thickness of the adsorbent material 109 in the direction of the longitudinal axis 107 is less than the length of the housing 103 in the longitudinal direction, thereby creating two voids 111. In the example of FIG. 2 there are three voids, however, there may be two of the voids 111 or there may be more than three of the voids 111.

The voids 111 are spaces within the housing 103 that do not include the adsorbent material 109. In addition to holding the adsorbent material 109, the guide may prevent the adsorbent material 109 from entering one of the voids 111. In comparison to a situation in which the housing 103 is filled entirely with the adsorbent material 109, the voids 111 may allow air to flow through the chamber 100 at an increased rate. Further, the creation of two barriers between the ports 105 and 123 may have the advantage of forcing the fluid to pass through different areas of the adsorbent material 109 over time. In other words, each of the voids 111 may cause a diffusion of fluid pass. The diffusion may help ensure that the fluid does not continually pass through the same area of the adsorbent material 109 over time.

In particular, if there is only one barrier between the two ports 105 and 123, it is possible that fluid will continue to pass through the same area of the adsorbent material 109 and thereby degrade this particular area of the adsorbent material 109. Other areas of the adsorbent material 109 may continue to function normally. By creating two barriers between the ports 105 and 123, such that the fluid must pass through a first one of the voids 111 before reaching the first barrier of the adsorbent material 109 and a second one of the voids 111 before reaching the second barrier of the adsorbent material 109, the fluid diffuses in the voids 111 and might not flow through the same area of the adsorbent material 109 over time. Accordingly, the adsorbent material may last longer, i.e., the effect of the adsorbent material may degrade more slowly. The same effect may be achieved by arranging the adsorbent material 109 so as to cause the fluid to pass through one of the voids 111 after passing through a first set of the adsorbent material 109 and before passing through a second set of the adsorbent material, where the first set does not coincide with (i.e., is not the same as) the second set.

The segments 113 of the guide form a channel for the adsorbent material 109. Accordingly, the adsorbent material 109 stays within the channel and does not enter the voids 111. It is also possible that the adsorbent material 109 may be secured within the housing 103 without the guide, e.g. using an adhesive. By covering the transverse cross-section of the housing 103, the adsorbent material 109 forms the barrier between the two ports 105 and 123. In other words, the adsorbent material 109 blocks passage of fluid through the chamber 100, from the port 123 to the port 105. Further, the adsorbent material 109 may cover two different transverse cross-sections of the housing 103 in order to create two barriers between the two ports 105 and 123.

Figure 3:
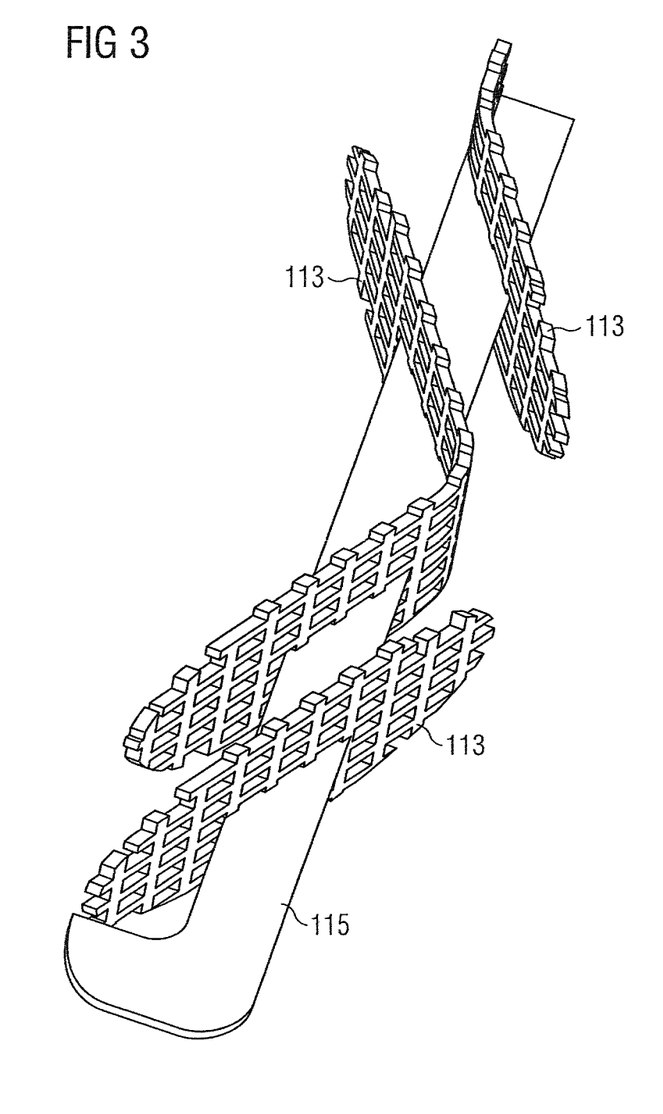
FIG. 3 shows a supporting element that extends through segments of a guide.

The cross-section of the adsorbent material 109 may be V-shaped. Accordingly, the cross-section of the guide may also be V-shaped. A supporting element 115, as shown in FIG. 3, may be used for inserting the guide into the housing 103. At least one of the segments 113 may completely cover the transverse cross-section of the housing 103. In some cases, all of the segments 113 completely cover the transverse cross-section of the housing 103. In other cases, at least one of the segments 113 does not completely cover the transverse cross-section of the housing 103. In particular, one of the segments 113 might only extend part of the way across the housing 103. This may have the advantage that the adsorbent material 109 can be easily arranged so as to fill in the area between the segments 113.

The V-shaped design increases the exposed surface of the adsorbent material 109, so that the restriction of fluid flow through the housing 103 is reduced in comparison to a configuration in which the adsorbent material is along a transverse cross section (i.e. a horizontal axis 125 of the housing 103), perpendicular to the longitudinal axis 107. In particular, restriction of fluid flow through the housing 103 decreases as the angle $\alpha$ between the horizontal axis 125 of the housing 103 and either one of the legs of the V-shape increases. In other words, fluid can flow through the housing at a faster rate as the angle $\alpha$ between the horizontal axis 125 and the leg of the V-shape increases.

In the V-shaped design, one of the segments 113 may be thought of as one leg of the V-shape and another one of the segments 113 may be thought of as another leg of the V-shape.

An end portion of one of the segments 113, which is closest to the port 105, may be parallel to the longitudinal axis 107. This may make it easier to insert the adsorbent material 109 into the guide. For example, a funnel may be supported by the housing 103 and the end portion of the segment 113. The adsorbent material 109 may be pushed through the funnel and into the guide. In some cases, the adsorbent material 109 includes multiple components, e.g., in the form of spheres or cylindrical pellets. The components of the adsorbent material 109 may be poured into the funnel and gravity may cause the adsorbent material components to arrange themselves within the guide. Some shaking of the chamber 100 and the guide may be performed in order to further arrange the adsorbent material components.

The supporting element 115 may be used to insert the guide into the housing 103.

The cap 117 may be mounted on one end of the housing 103. In such cases, the port 105 extends through the cap 117. Accordingly, multiple pegs 119 protrude from the cap toward the interior of the housing 103. The air permeable element 121 may be arranged within the housing 103 between the cap 117 and an end of the guide (e.g., the end portion of one of the segments 113). The pegs 119 may be in contact with the air permeable element 121. The pegs 119 may be arranged so as to push the air permeable element 121 against the guide and the adsorbent material. By doing that the adsorbent material and the segments 113 are fixed and no vibration e.g. from a combustion engine, could harm, i.e., cause undesired movement of or damage to, the adsorbent material.

The arrangement described above facilitates easy assembly of the chamber 100. In particular, the segments 113 can be formed via injection molding and attached to the supporting element 115. The segments 113 and the supporting element 115 can be produced by injection molding as one part. The supporting element 115 can then be inserted into the housing 103. Following that, the adsorbent material 109, e.g. in the form of cylinders or pellets, can be poured into the guide, possibly using the funnel. After a sufficient amount of the adsorbent material 109 has been poured into the guide, the air permeable element 121 can be pushed against the guide by means of the cap 117 and the pegs 119 protruding from the cap 117, which contact the air permeable element 121.

The adsorbent material 109 may comprise one or more of the following: an oxygen containing compound, a carbon-based compound, a polymer-based compound, zeolites, porous silica, porous alumina, pillared clays, molecular sieves. For example, the adsorbent material 109 may be wood-based or coal-based formed activated carbon. The adsorbent material 109 may be pulverized activated carbon. The activated carbon may be prepared by forming activated carbon in powdered form into a mass having a certain size.

The adsorbent material 109 may be in the form of granules having an irregular shape. For example, the adsorbent material 109 may be in the form of activated carbon granules.

When the adsorbent material 109 is composed of components and those components are granular, cylindrical or spherical, the components may have a diameter suitable for secondary adsorption of substances in fuel vapor. In particular, the fluid may be a fuel vapor and the fuel vapor may pass through another chamber before passing through the chamber 100. The other chamber may have multiple components of adsorbent material having a diameter greater than the components of the adsorbent material 109 in the chamber 100. The fluid may pass through further chambers before or after passing through the chamber 100 or the other chamber. The further chambers may also contain components of adsorbent material.

One of the ports 105 and 123 (e.g., the port 105) may open to the atmosphere and the second of the ports 105 and 123 (e.g., the port 123) may be arranged to receive the fluid. In particular, the port 105 may be arranged to allow the exit of air from the chamber 100 and the port 123 may be arranged to allow the entry of the fluid into the chamber 100.

FIG. 3 shows the supporting element 115 for holding the segments 113 within the housing 103. In the example of FIG. 3 there are three of the segments 113. The supporting element 115 may be hook-shaped at one end and may be elongated. In other words, the supporting element 115 may be "L" or boot-shaped. The length of the supporting element 115 may be at least five times its width.

Figure 4:
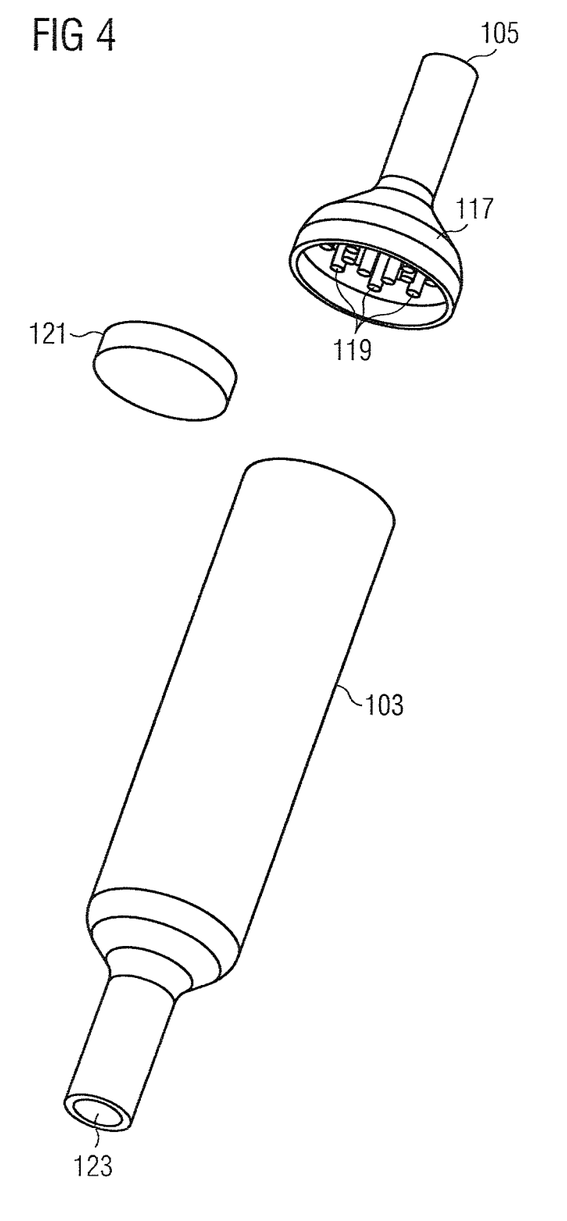
FIG. 4 shows separate elements of the chamber.

FIG. 4 shows elements of the chamber 100. In particular, the cap 117 has not yet been attached to the housing 103. In addition, the air permeable element 121 has not yet been placed in between the pegs 119 and the guide.

Figures 5, 6:
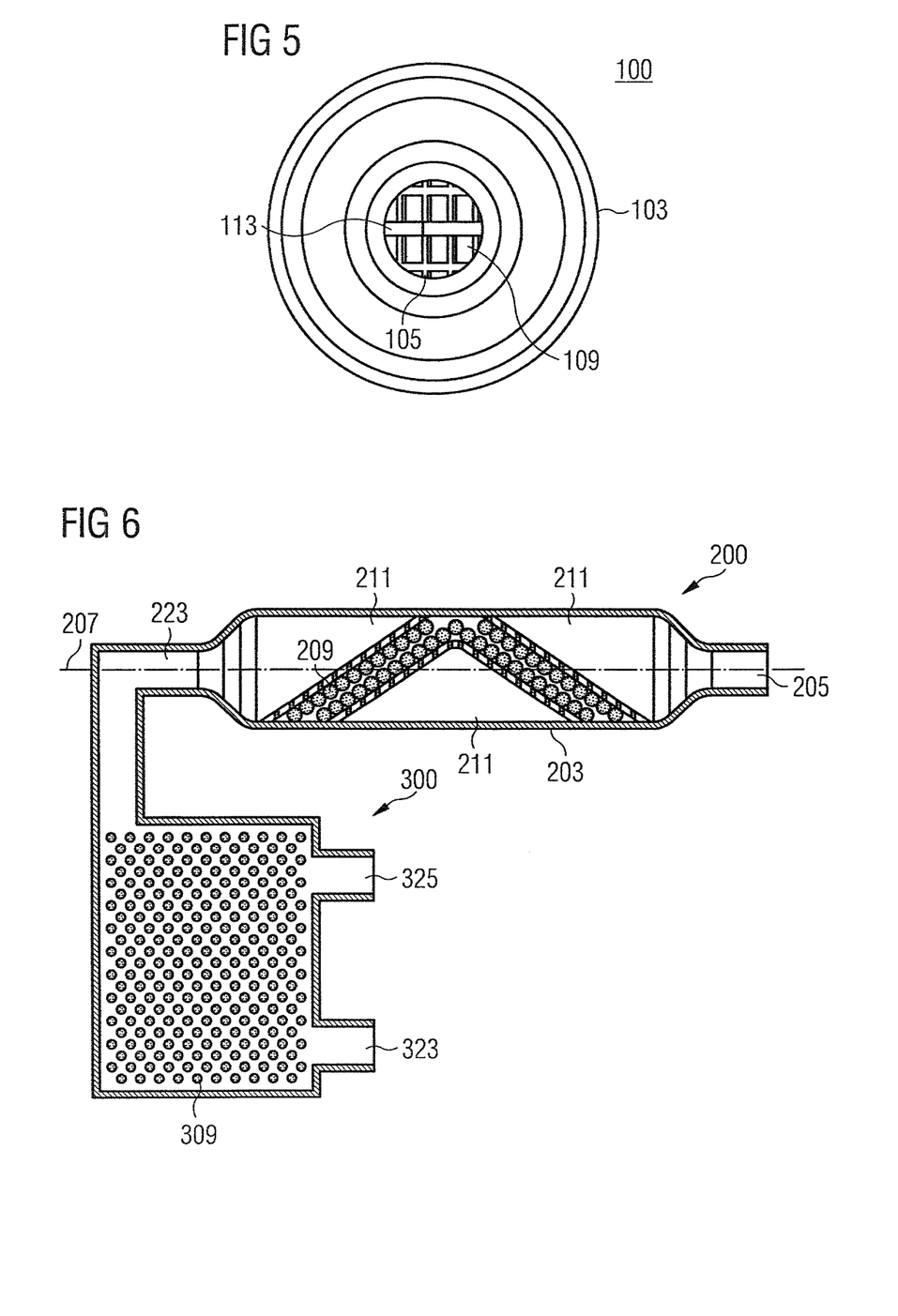
FIG. 5 shows an overhead view of the chamber looking down through a port.
FIG. 6 shows a container comprising two chambers.

FIG. 5 shows a view through the port 105 into the chamber 100. In particular, FIG. 5 shows a view through the port 105, not including the cap 117, the pegs 119, the air permeable element 121, or the adsorbent material 109.

FIG. 6 shows a container including a first chamber 200 and a second chamber 300. Unless otherwise specified, the first chamber 200 may include the features of the chamber 100. In particular, the first chamber 200 may include a housing 203, and ports 205 and 223 located at opposing ends of the housing. The port 205 (e.g. an atmosphere port) may open to the atmosphere and the port 223 may open to the second chamber 300. Adsorbent material 209 may be arranged within the housing 203. The adsorbent material 209 may be adapted for removing substances from a fluid, as described above with respect to the adsorbent material 109. A thickness of the adsorbent material in a direction of a longitudinal axis 207 may be less than the length of the housing 203 in the longitudinal direction, thereby creating at least two voids 211.

The second chamber 300 may include further adsorbent material 309. The second chamber 300 may be fluidly connected to the first chamber via the port 223. The second chamber 300 may include two further ports 323 and 325. The port 323 may open to a fuel tank and the port 325 may open to an engine intake system. In particular, fuel vapor may pass into the second chamber 300 via the port 323 and air may pass out of the second chamber 300 via the port 325. Further chambers may also be included in the container, e.g. between the first chamber 200 and the second chamber 300.

LIST OF REFERENCE NUMERALS 100 chamber
103 housing
105 port
107 longitudinal axis
109 adsorbent material
111 void
113 segment of the guide
115 supporting element
117 cap
119 peg
121 air-permeable element
123 port
125 horizontal axis
200 first chamber
203 housing
205 port
207 longitudinal axis
209 adsorbent material
211 void
223 port
300 second chamber
309 further adsorbent material
323 port
325 port

What is claimed is:

1. A chamber comprising:
   a housing having two ports and a longitudinal axis;
   adsorbent material arranged within the housing;
   wherein the adsorbent material is adapted for removing substances from a fluid;
   wherein the adsorbent material completely covers a transverse cross-section of the housing, such that the adsorbent material forms at least one barrier between the two ports;
   wherein a thickness of the adsorbent material in a direction of the longitudinal axis is less than a length of the housing in the longitudinal direction, thereby creating at least two voids;
   a guide for holding the adsorbent material,
   wherein the guide is porous, with pores of the guide being smaller in size than the adsorbent material,
   wherein the guide provides a channel for the adsorbent material,
   wherein the guide extends across the housing from a first side of the housing to a second side of the housing opposite to the first side,
   wherein the guide crosses the housing at least twice in order to create at least two barriers between the two ports, such that a cross section of the guide is V-shaped.

2. The chamber of claim 1, wherein edges of the guide are in continuous contact with the housing.

3. The chamber of claim 2, wherein the guide is formed from at least two segments, the segments being spaced apart from each other to create the channel for the adsorbent material.

4. The chamber of claim 3, further comprising a horizontal axis that is perpendicular to the longitudinal axis whereby the angle between the horizontal axis and one of the segments of the guide is between 20 and 70 degrees.

5. The chamber of claim 3, wherein an end portion of one of the segments that is closest to one of the ports is parallel to the longitudinal axis.

6. The chamber of claim 1, further comprising:
a supporting element for holding the guide, wherein the supporting element extends through segments of the guide.

7. The chamber of claim 1, further comprising a cap attached to one end of the housing and one of the two ports extends through the cap, wherein multiple pegs protrude from the cap.

8. The chamber of claim 7, further comprising:
an air-permeable element arranged within the housing between the cap and an end of the guide,
wherein the pegs are in contact with the air-permeable element,
wherein the pegs are arranged so as to push the air-permeable element against the guide, and/or the adsorbent material.

9. The chamber of claim 1, wherein the adsorbent material comprises at least one compound selected from the group consisting of an oxygen-containing compound, a carbon-based compound, a polymer-based compound, zeolites, porous silica, porous alumina, pillared clays and molecular sieves.

10. The chamber of claim 1, wherein the adsorbent material includes multiple components, wherein the components have a shape selected from the group consisting of the following shapes: granular, spherical, cylindrical, hollow-cylinder, star, twisted spiral, asterisk, and configured ribbons.

11. The chamber of claim 10, wherein the components of the adsorbent material are selected from the group consisting of granular, cylindrical and spherical, and have a diameter of about 2 mm to about 8 mm.

12. The chamber of claim 1, wherein one of the two ports opens to the atmosphere and the second port is arranged to receive the fluid.

13. The chamber of claim 1, wherein the fluid is fuel vapor from a fuel tank of a vehicle.

14. The chamber of claim 1, wherein the adsorbent material has a butane working capacity of about 3 g/dl to about 12 g/dl.

15. A container comprising:
a first chamber, the first chamber comprising:
a housing having two ports and a longitudinal axis;
adsorbent material arranged within the housing;
wherein the adsorbent material is adapted for removing substances from a fluid;
wherein the adsorbent material completely covers a transverse cross-section of the housing, such that the adsorbent material forms at least one barrier between the two ports;
wherein a thickness of the adsorbent material in a direction of the longitudinal axis is less than the length of the housing in the longitudinal direction, thereby creating at least two voids;
the container further comprising a second chamber, the second chamber including:
further adsorbent material, and
a charge port arranged to receive fuel vapor from a fuel tank;
wherein the second chamber is fluidly connected to the first chamber;
wherein the further adsorbent material of the second chamber has a higher effective butane working capacity and a higher flow resistance in comparison to the adsorbent material of the first chamber.

16. The container of claim 15, further comprising a cap attached to one end of the housing and one of the two ports extends through the cap, wherein multiple pegs protrude from the cap.

17. The container of claim 16, further comprising:
a guide for holding the adsorbent material,
an air-permeable element arranged within the housing between the cap and an end of the guide,
wherein the pegs are in contact with the air-permeable element,
wherein the pegs are arranged so as to push the air-permeable element against the adsorbent material.

18. A method of manufacturing a chamber, the chamber comprising a housing having two ports and a longitudinal axis, the method comprising:
axially inserting a guide into the housing, wherein the guide forms a channel and a periphery of the guide is in contact with the housing;
arranging adsorbent material within the channel;
wherein the adsorbent material is adapted for removing substances from a fluid;
wherein the adsorbent material completely covers a transverse cross-section of the housing, such that the adsorbent material forms at least one barrier between the two ports;
wherein a thickness of the adsorbent material in a direction of the longitudinal axis is less than the length of the housing in the longitudinal direction, thereby creating at least two voids;
wherein the guide is porous, with pores of the guide being smaller in size than the adsorbent material,
wherein the guide extends across the housing from a first side of the housing to a second side of the housing opposite to the first side,
wherein the guide crosses the housing at least twice in order to create at least two barriers between the two ports, such that a cross section of the guide is V-shaped,
axially inserting an air-permeable element into the housing, so that the air-permeable element contacts an end of the guide and/or the adsorbent material;
placing a cap over the air-permeable element, such that pegs protruding from the cap contact the air-permeable element.

* * * * *